United States Patent [19]

LaBudde

[11] Patent Number: 5,152,174
[45] Date of Patent: Oct. 6, 1992

[54] MASS FLOW RATE SENSOR AND METHOD

[76] Inventor: Edward V. LaBudde, 1768 Upper Ranch Rd., Westlake Village, Calif.

[21] Appl. No.: 587,226

[22] Filed: Sep. 24, 1990

[51] Int. Cl.⁵ .......................... G01F 1/66; G01F 1/86
[52] U.S. Cl. .................. 73/861.02; 73/861.27
[58] Field of Search ........... 73/861.02, 861.03, 861.27, 73/861.28, 861.29, 861.31

[56] References Cited

U.S. PATENT DOCUMENTS

| | | | |
|---|---|---|---|
| 3,727,454 | 4/1973 | Courty | 73/861.03 |
| 3,818,877 | 6/1974 | Barrera et al. | 73/861.23 |
| 3,901,078 | 8/1975 | McShane | 73/861.03 |
| 4,015,470 | 4/1977 | Morrison | 73/861.03 |
| 4,240,299 | 12/1980 | Joy et al. | 73/861.23 |
| 4,265,125 | 5/1981 | Mahany | 73/861.03 |
| 4,320,666 | 3/1982 | Redding | 73/861.28 |
| 4,375,768 | 3/1983 | Beck et al. | 73/861.23 |
| 4,419,898 | 12/1983 | Zanker et al. | 73/861.02 |
| 4,567,776 | 2/1986 | Adachi | 73/861.23 |
| 4,762,012 | 8/1988 | Brown | 73/866.4 |
| 4,815,324 | 3/1989 | Tada et al. | 73/861.22 |

Primary Examiner—Herbert Goldstein
Attorney, Agent, or Firm—Koppel & Jacobs

[57] ABSTRACT

An acoustic signal is transmitted into a flowing gas (10). The velocities of propagation of the signal in two predetermined directions are measured, and combined with sensed gas pressure and the frequency of the acoustic signal to compute the mass flow rate of the gas. The velocities are preferably measured as analogous phase differences between the transmitted signal, and the signal as incident upon receivers (18,20) spaced from the signal transmitter (16) by predetermined distances in the predetermined directions. The phase differences are preferably sensed using at least one phase locked loop (44) which adjusts the signal frequency so that a predetermined phase difference is maintained between the transmitted signal and one of the received signals or a derivative thereof. The flow rate computation includes obtaining the speed of the acoustic signal (speed of sound) in the material and the velocity of movement of the gas from the sensed phase differences. The sensor may also be used to sense the velocity of movement of a liquid or solid, in which case the pressure measurement is unnecessary. The velocities may alternatively be measured as propagation times or wavelength shifts, rather than as phase differences. In addition, the temperature of the flow of a gas may be obtained by the same apparatus.

25 Claims, 5 Drawing Sheets

MASS FLOW RATE SENSOR AND METHOD

BACKGROUND OF THE INVENTION

1. Field of the Invention

The present invention relates to a sensor and method for measuring the mass flow rate of a gaseous, liquid, or solid material.

2. Description of the Related Art

Sensors for measuring the mass flow rate of flowing, fluidic materials such as air find applications in many areas of technology. Precise control of the ratio of fuel and air supplied into the intake of the engine of an automotive vehicle is possible if the mass flow rates of the individual constituents can be accurately sensed or measured. Mass flow sensors which have been used for this purpose in the past generally require that a mechanical element be disposed in the fluid flow path. The mechanical element may be displaced, rotated, etc. by an amount corresponding to the fluid flow rate.

Alternatively, the obstruction may be in the form of a fixed member such as a Karman vortex shedder as disclosed in U.S. Pat. No. 4,815,324, entitled "INTAKE AIR METER FOR AN INTERNAL COMBUSTION ENGINE", issued Mar. 28, 1989, to Y. Tada et al. The shedder generates a vortex street which phase modulates an ultrasonic signal. The modulation frequency increases with the flow rate of the fluid. The phase modulated signal is received and processed to compute the flow rate of the fluid.

Generally, any flow rate sensor which requires an obstruction is undesirable since it creates turbulent flow and resulting inefficiency in applications where laminar flow is preferred.

A flow rate sensor which utilizes two contrapropagating ultrasonic waves which are periodically switched back and forth for measuring fluid velocity, rather than true mass flow, is disclosed in U.S. Pat. No. 4,320,666, entitled "FLUID FLOW MEASURING APPARATUS", issued Mar. 23, 1982, to R. Redding. This reference teaches the use of two phase locked loops for separately measuring the propagation times of the contrapropagating signals on a time sharing basis. Although eliminating the obstructions required in the Karman vortex systems, switching between the two signals limits Redding's system to applications in which relatively slow response times are tolerable. Automotive applications require a 15 millisecond response time, which is unattainable in an ultrasonic system such as Redding's with periodically switched signals.

In addition, automotive applications require measurement of true mass flow rate, rather than material velocity. The accuracy of a system such as Redding's which directly measures only velocity, and which may calculate a mass flow rate using approximated, rather than measured values, is insufficient for this purpose.

My previous U.S. Pat. No. 4,829,305, entitled "MEDIUM DISTANCE MEASUREMENT SYSTEM AND METHOD", issued May 9, 1989, discloses a system including an optical signal and a phase locked loop arrangement which produces an output signal having a frequency which varies as a predetermined function of the distance from the sensor to a target. This is accomplished by adjusting the frequency of the optical signal which is transmitted to a target in such a manner as to maintain a constant phase difference between the transmitted signal and an echo of the signal reflected back to the sensor from the target. The principle of frequency adjustment to maintain a fixed phase difference between two signals as disclosed in my prior patent may be advantageously incorporated into a mass flow rate sensor embodying the present invention as will be described in detail below.

SUMMARY OF THE INVENTION

An acoustic signal is transmitted into a flowing material which may be gas, liquid, or solid. The velocities of propagation of the signal in two predetermined directions are measured, and combined with sensed gas pressure and the frequency of the acoustic signal to compute the mass flow rate of the gas. The velocities are preferably measured as analogous phase differences between the transmitted signal, and the signal as incident upon receivers spaced from the signal transmitter by predetermined distances in the predetermined directions. The phase differences are preferably sensed using at least one phase locked loop which adjusts the signal frequency so that a predetermined phase difference is maintained between the transmitted signal and one of the received signals or a derivative thereof. The mass flow rate computation includes deriving the speed of the acoustic signal (speed of sound) in the material and the mass flow of the gas from the sensed phase differences. The sensor may also be used to sense the velocity of movement of a liquid or solid, in which case the pressure measurement is unnecessary. The velocities may alternatively be measured as propagation times or wavelength shifts, rather than as phase differences.

The present invention enables sensing true mass flow rate, rather than just material velocity, with an accuracy and response time fast enough for practical automotive applications. This is because the measurements are taken continuously, rather than at switched intervals as taught by Redding. The invention is further capable of sensing the temperature and/or speed of sound of a material with a high degree of precision using direct measurements.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
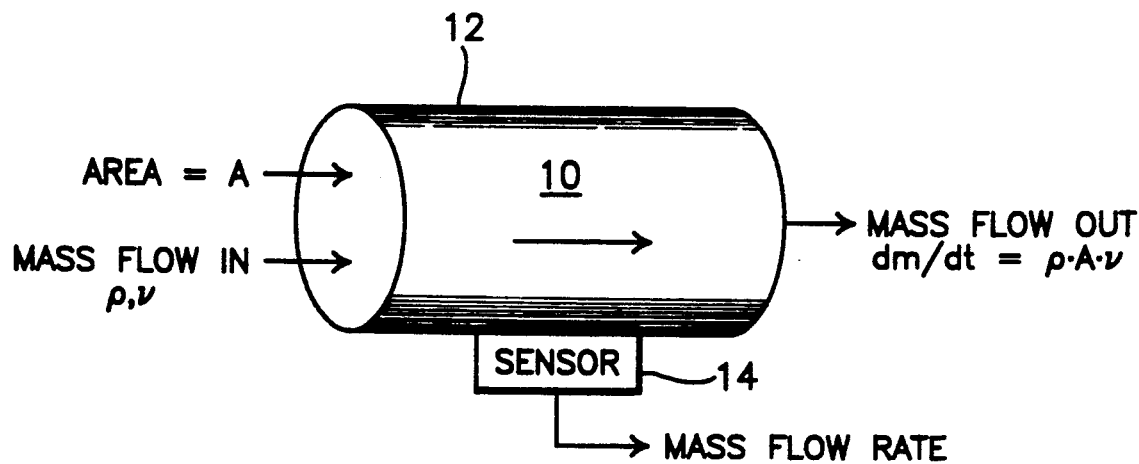
FIG. 1 is a diagram illustrating the principle of the present invention.

Referring now to FIG. 1 of the drawing, a gas 10 such as air having a density ρ flows through a passageway or conduit 12 with a velocity v. The conduit 12 may be the air intake duct of an internal combustion engine (not shown). Although the present invention is especially suited for sensing or measuring the mass flow rate of a gas, it is also applicable to liquids or solids. An example of the latter would be an extrusion passing through or emerging from a die (not shown).

With the area of the conduit 12 taken as A, the mass flow rate dm/dt of the gas 10 through the conduit 12 is given as $$dm/dt = \rho \cdot A \cdot v \qquad \text{Equ(1)}$$

In order to provide an accurate measurement of mass flow rate dm/dt, it is necessary to obtain accurate measurements of density ρ and velocity v which are variables. The area A is a constant. In accordance with the present invention, both the gas density and velocity can be measured accurately without disturbing the flow of the gas 10 through the conduit 12.

Where an acoustic wave or signal is utilized for measuring the mass flow rate, the signal must satisfy the following wave equation $$c^2 \frac{\partial^2 P}{\partial x^2} = \frac{\partial^2 P}{\partial t^2} \qquad \text{Equ (2)}$$

where P is the acoustic pressure, t is time, c is the speed of acoustic propagation of the acoustic wave through the material 10 (speed of sound), and x is displacement.

The speed of sound c can be further defined as $$c = \sqrt{\frac{\partial P}{\partial \rho}} \qquad \text{Equ (3)}$$

The speed of sound c is thereby equal to the square root of the rate of change of the acoustic pressure P with respect to the material density ρ. This is the relationship which provides the basis for acoustic measurement of fluid density ρ.

It is further recognized that $$\frac{\partial P}{\partial \rho} = \frac{B}{\rho} \qquad \text{Equ (4)}$$

in an elastic material. Thus, $$c^2 = \frac{B}{\rho} \qquad \text{Equ (5)}$$

where B is the bulk modulus of the material. Thus, the density ρ is a function of the material properties which can be determined if the speed of sound c is known.

Solving Equ(5) for density ρ produces $$\rho = \frac{B}{c^2} \qquad \text{Equ (6)}$$

Equ(6) is valid for solids, liquids, and gases. Substituting Equ(6) into Equ(1) produces $$dm/dt = \frac{B}{c^2} \cdot v \cdot A \qquad \text{Equ (7)}$$

For many materials, especially liquids, the mass flow rate dm/dt may be accurately measured by sensing the speed of sound c and velocity of movement v of the material 10 through the conduit 12, since the bulk modulus B is substantially constant. However, for gases, the bulk modulus B varies in accordance with the gas pressure P such that $$B = \gamma P \qquad \text{Equ(8)}$$

where λ is the ratio of specific heats of the gas. Thus, in order to obtain an accurate measurement of mass flow rate of a gas, it is also necessary to sense the pressure P. Substituting Equ(8) into Equ(7) produces $$dm/dt = \frac{\gamma P}{c^2} \cdot v \cdot A \qquad \text{Equ (9)}$$

A sensor 14 embodying the present invention for sensing the mass flow rate of a gas flowing through the conduit 12 is therefore constructed to sense the speed of sound c, speed of movement v, and pressure P, and calculate the flow rate dm/dt in accordance with Equ(9) by multiplying by the product γA, which is constant.

It will be noted that the value of the specific heat ratio γ in gases can vary if contaminants are present in the gas. Humidity in air, for example, can cause a variation in the effective value of γ because water vapor has a lower γ than dry air. This effect is small for normal conditions, and is less than ½% of error for the most extreme variations in normal atmosphere. The effects of variations in γ are much smaller than the mean molecular weight variation caused by water vapor concentration which might be as high as 3%. Thus, conventional methods which depend on the measurement of total air mass would have an error due to humidity.

It is possible to calculate the mass flow rate from measured values of pressure P, and speed of movement v, and a separate temperature measurement. However, this would cause errors due to changes in mean molecular weight.

In accordance with the principles of my prior patent as referenced above, the phase shift φ due to propagation of a periodically varying signal through a material by a distance L is given as $$\phi = \frac{2\pi L}{\lambda} = \frac{2\pi f L}{u} \qquad \text{Equ (10)}$$

where u is the speed of the signal wavefront through the material, λ is the wavelength of the signal, and f is the frequency of the signal. A phase locked loop is arranged to achieve a given phase reference REF such that φ=REF. Solving Equ(10) for f gives $$f = \frac{REF \cdot u}{2\pi L} \quad \text{Equ (11)}$$

Thus, the frequency is directly proportional to the speed u if the length L is constant. This relationship is used to measure both c and $v$.

Figure 2:
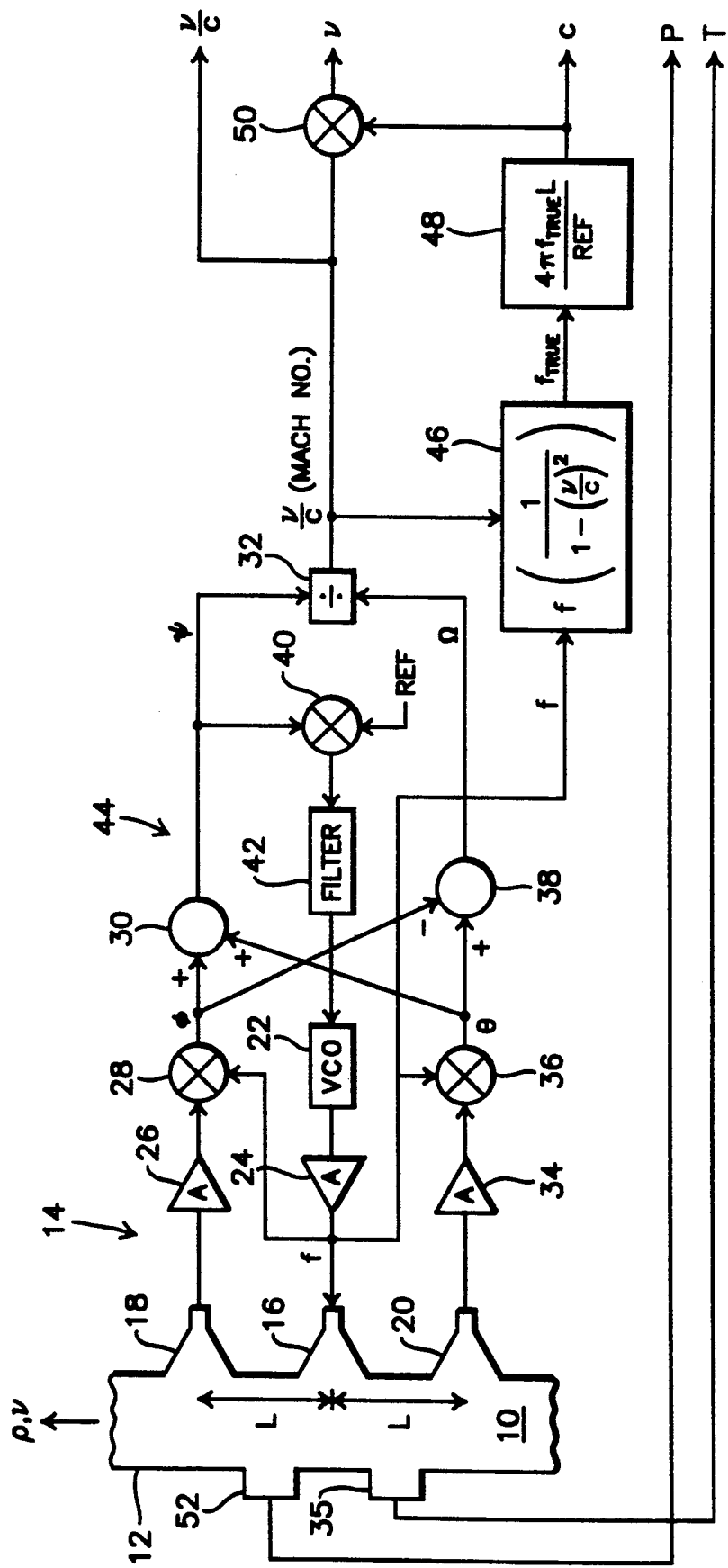
FIG. 2 is a schematic diagram illustrating a first section of a mass flow rate sensor embodying the present invention.

Referring now to FIG. 2, the present sensor 14 includes an acoustic transducer or transmitter 16 for transmitting a periodically varying signal into the material 10, which is assumed to flow upwardly through the conduit 12 as viewed in the drawing. Although it is within the scope of the present invention to use a signal of any frequency, a signal at an acoustic or audible, including ultrasonic frequency, is especially suitable for measuring mass flow of gases. An acoustic transducer or receiver 18 is disposed downstream of the transmitter 16 for receiving the transmitted signal after propagation through the material 10 by the distance L in the direction of movement or flow of the material. Another acoustic transducer or receiver 20 is similarly disposed upstream of the transmitter 16 by the distance L. The transducers 16, 18 and 20 may be conventional units operating on the piezoelectric or any other applicable principle.

Since it is necessary to derive both $v$ and c, it is necessary to obtain measurements of the two variables and solve two equations in two unknowns. The total velocity of propagation of the acoustic signal or wavefront through the material 10 depends on both the speed of sound c and the velocity of movement $v$ of the material 10. Since the transmitter 16 and receivers 18 and 20 are aligned with the flow direction of the material 10 through the conduit 12, c and $v$ will combine algebraically. More specifically, the acoustic signal sensed by the downstream receiver 18 will have a velocity of $c+v$, whereas the signal as sensed by the upstream receiver 20 will have a velocity of $c-v$. Since the frequency of the sound is invariant (the transmitter and receiver are stationary), the effect of the movement of the material 10 is to alter the wavelengths of the signal as received by the receivers 18 and 20.

Since $f\lambda = u$, from basic physics, the wavelength sensed $\lambda_u$ by the upstream receiver 18 is $$\lambda_u = \frac{c-v}{f} \quad \text{Equ (12)}$$

whereas the wavelength $\lambda_d$ sensed by the downstream receiver 20 is $$\lambda_d = \frac{c+v}{f} \quad \text{Equ (13)}$$

In accordance with the present invention, the mass flow rate as determined by measurements of c and $v$ may be computed based on measurements of the velocities, flight or propagation times, wavelength shifts, or phase shifts of the signals received by the receivers 18 and 20, since the same information with regard to the wavefront velocity u is contained in all of these parameters. The phase difference method utilized in my prior patent is the preferred method of embodying the present sensor 14 from the standpoint of hardware implementation, as will be described in detail below.

The phase of the received signals relative to the transmitted signal varies with the velocity and distance of propagation. The phase shift, $\phi$, at the downstream receiver 18 is $$\phi = 2\pi \frac{L_d}{\lambda_d} \quad \text{Equ (14)}$$

whereas the phase shift, $\theta$, at the upstream receiver 20 is $$\theta = 2\pi \frac{L_u}{\lambda_u} \quad \text{Equ (15)}$$

Although f, $L_d$ and $L_u$ may theoretically have any arbitrary values, these parameters will be chosen in an actual application to optimize the operation of the sensor 14 by minimizing internal delays in the transmitter 16 and receivers 18 and 20, as well as other practical considerations.

Combining Equ(13) with Equ(14) produces $$\phi = \frac{2\pi f L_d}{c+v} \quad \text{Equ (16)}$$

Similarly, combining Equ(12) with Equ(15) produces $$\theta = \frac{2\pi f L_u}{c-v} \quad \text{Equ (17)}$$

These provide the two equations in two unknowns required to derive c and $v$. The equations could be solved directly using the outputs from the receivers 18 and 20. However, utilization of a phase locked loop controls the frequency f so that the phase detectors of the loop remain in their linear range. This is a very important consideration for a highly accurate mass flow rate sensor. It will be understood, however, that the present invention may be practiced measuring phase shift and without using a phase locked loop.

As illustrated in FIG. 2, the acoustic signal is generated by a voltage controlled oscillator (VCO) 22 and fed through an amplifier 24 to the transmitter 16 to constitute the signal f. It is further within the scope of the invention to modulate the acoustic signal onto a carrier signal having a frequency which is generally at least ten times the frequency of the acoustic signal. In this case, a modulator/demodulator arrangement will be provided for recovering the acoustic signals sensed by the receivers 18 and 20. The output of the downstream receiver 18 is fed through an amplifier 26, mixer 28, and adder 30 to an input of a divider 32. The output of the upstream receiver 20 is fed through an amplifier 34, mixer 36, and subtractor 38 to another input of the divider 32. The output of the adder 30 is also applied through a mixer 40 and loop filter 42 to an input of the VCO 22. A reference phase signal REF is applied to another input of the mixer 40. The output of the mixer 28 is connected to an input of the subtractor 38, whereas the output of the mixer 36 is connected to an input of the adder 30. The output of the amplifier 24 is also connected to inputs of the mixers 28 and 36.

The VCO 22, mixer 40, and filter 42 constitute a phase locked loop (PLL) 44 which maintains the phase difference between the output of the adder 30 and the output frequency of the VCO 22 equal to the value REF, which is preferably $\pi/2$ radians or 90° (or multiples of $\pi/2$ radians) for linear operation of the sensor 14.

The mixers 28, 36 and 40 produce outputs which are proportional to the difference in phase between the signals at the inputs thereof. The mixer 28 produces the signal $\phi$ which corresponds to the phase difference between the signal f and the signal received by the downstream receiver 18 in accordance with Equ(16). The mixer 36 similarly produces the signal $\theta$ which corresponds to the phase difference between the signal f and the signal received by the upstream receiver 20 in accordance with Equ(17).

In order to facilitate a simple phase locked loop with the phase detectors or mixers 28, 36 and 40 operating near the ideal linear point, the adder 30 is provided to produce a signal $\psi = \phi + \theta$. The subtractor 38 produces a signal $\Omega = \phi - \theta$. The signal $\psi$ is selected as the input to the PLL 44 to minimize the range of phase variation about the operating point REF. However, the output of the subtractor 38, mixer 28, or mixer 36 may alternatively used as the input to the PLL 44 within the scope of the present invention.

The phase locked loop 44 will force $\psi$ = REF by adjusting the frequency f until the relationship is stably reached. Thus, $$REF = 2\pi f \left( \frac{L_u}{c - v} + \frac{L_d}{c + v} \right) \quad \text{Equ (18)}$$

Solving Equ(18) for f gives $$f = \frac{REF}{2\pi} \left( \frac{1}{\frac{L_u}{c-v} + \frac{L_d}{c+v}} \right) \quad \text{Equ (19)}$$

The quotient or ratio of $\psi$ to $\Omega$ is produced by the divider 32, and is equal to the Mach number, or ratio of the material velocity $v$ to the speed of sound c in the material 10. A portion of the desired equation needed for mass flow and which is not dependent on the frequency f is derived as $$\frac{\omega}{\psi} = \frac{2\pi f \left( \frac{L_u}{c-v} - \frac{L_d}{c+v} \right)}{2\pi f \left( \frac{L_u}{c-v} + \frac{L_d}{c+v} \right)} = \frac{v}{c} \quad \text{Equ (20)}$$

Although $L_u$ and $L_d$ may be different within the scope of the present invention, the arrangement is simplified if $L_u = L_d = L$. Utilizing this assumption, the effects of the modulation of the frequency f by the velocity of movement $v$ of the material 10 can be eliminated, enabling a direct measurement of c. The corrected frequency $f_{TRUE}$ is computed by a computing unit 46 and given as $$f_{true} = f \left( \frac{1}{1 - \left( \frac{v}{c} \right)^2} \right) \quad \text{Equ (21)}$$

which can be derived from the Mach number $v/c$. $F_{TRUE}$ is therefore equal to $$f_{TRUE} = \frac{REF \cdot c}{4\pi L} \quad \text{Equ (22)}$$

Solving Equ(22) for c gives $$c = \frac{4\pi f_{TRUE} L}{REF} \quad \text{Equ (23)}$$

The value of c is computed by a computing unit 48 in accordance with Equ(23). The Mach number $v/c$ may be multiplied by the speed of sound c by a multiplier 50 to produce the velocity of movement $v$ of the material 10.

Where the material is a liquid, the mass flow rate may be computed without sensing the pressure P. However, for measuring the mass flow rate of a gas, a pressure sensor 52 is provided to directly sense the pressure P in the conduit 12.

Figure 3:
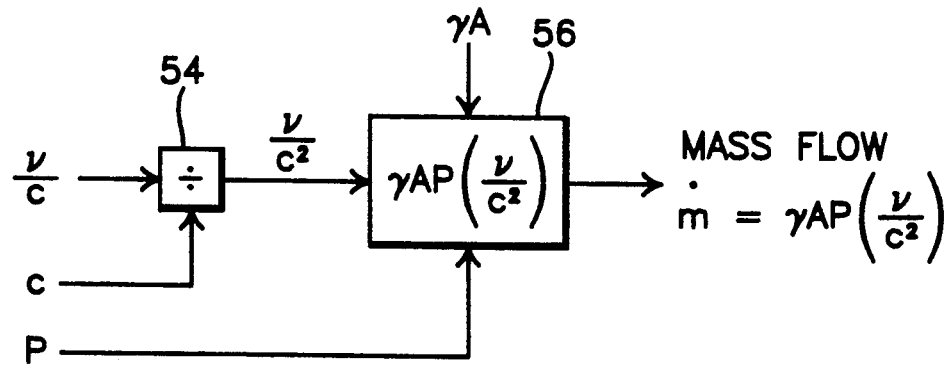
FIG. 3 is a block diagram illustrating a second section of the mass flow rate sensor.

FIG. 3 illustrates a first embodiment of a computing means for computing the mass flow rate as a function of the speed of sound c, Mach number $v/c$, and pressure P. A divider divides the Mach number $v/c$ by c to derive $v/c^2$. This quantity is applied to a computing unit 56 which also receives the pressure P from the sensor 52. The area A and specific heat ratio $\gamma$, which are constants, are also supplied to the computing unit 56. The unit 56 computes the mass flow rate dm/dt in accordance with the applied inputs as follows $$dm/dt = \gamma A P \left( \frac{v}{c^2} \right) \quad \text{Equ (24)}$$

Figure 4:
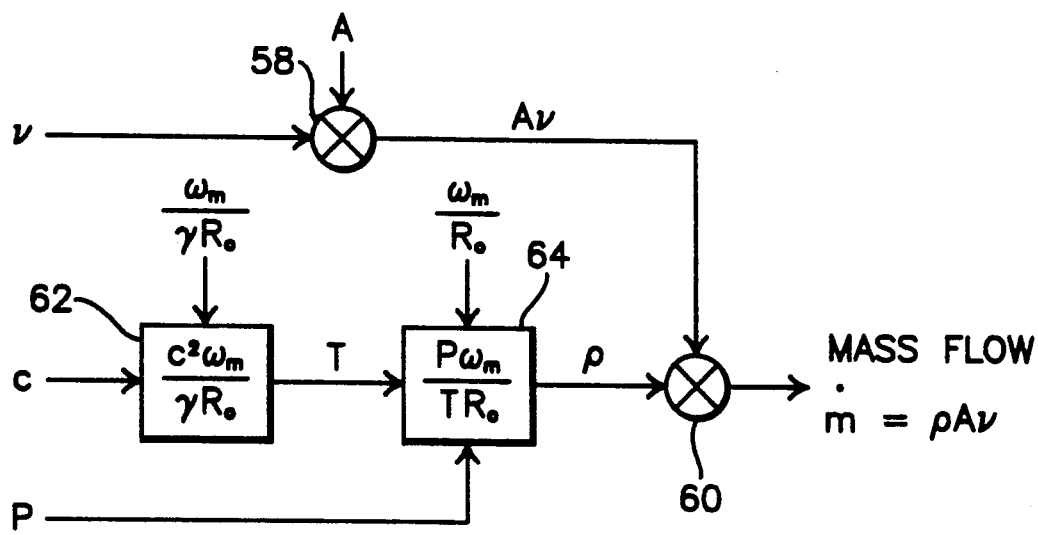
FIG. 4 is a block diagram illustrating an alternative embodiment of the second section of the mass flow rate sensor.

FIG. 4 illustrates an alternative computing means for computing the mass flow rate directly from the values of $v$, c and P. The velocity $v$ is multiplied by the area A in a multiplier 58 to obtain the product $v$A, which is applied to an input of another multiplier 60. A computing unit 62 computes the temperature T of the material 10 as a function of the speed of sound c in accordance with the function $$T = \frac{c^2 \omega_m}{\gamma R_o} \quad \text{Equ (25)}$$

where $\omega_m$ is the mean molecular weight and $R_o$ is the gas constant of the material 10, both of which are essentially constant. A computing unit 64 computes the density $\rho$ of the material 10 in accordance with the function.

It will be noted that the density $\rho$ can be calculated using Equ(26) based on a direct measurement of temperature $$\rho = \frac{P \omega_m}{T R_o} \quad \text{Equ (26)}$$

T by a separate sensor 35 shown in FIG. 2.

The multiplier 60 computes the mass flow rate dm/dt in accordance with Equ(1) as $\rho A v$.

The various computing units may be implemented in any desired manner in accordance with the present invention. Each computing unit may be comprised of individual hardware components. Alternatively, all of the computing units may be implemented as software under the control of a microcomputer (not shown).

Figure 5:
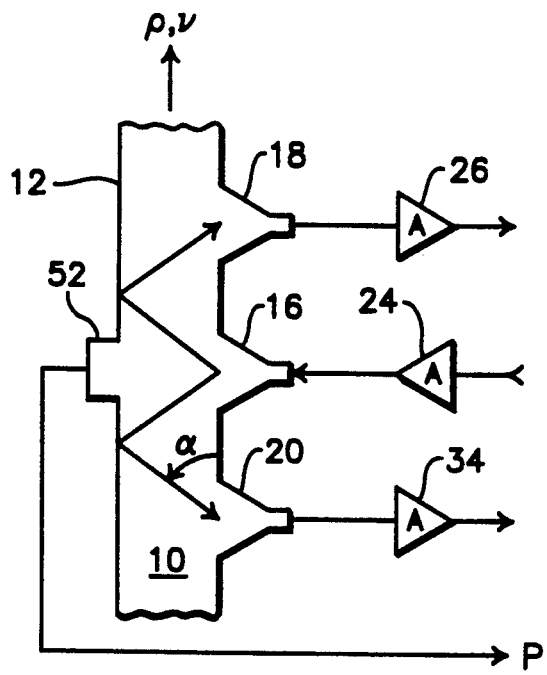
FIG. 5 is a schematic diagram illustrating an alternative arrangement for a transmitter and receivers of the present sensor.

FIG. 5 illustrates an alternative method of propagating the acoustic signal through the material in accordance with the present invention. Rather than receiving the acoustic signal parallel to the flow of the material 10, the receivers 18 and 20 are constructed to receive the acoustic signal transmitted by the transmitter 16 after it has bounced off the opposite wall (the left wall as viewed in the drawing) of the conduit 12. This increases the sensitivity of the sensor by increasing the propagation length of the acoustic signal. In an actual implementation, both the direct and reflected signals will be present in the material 10, and the receivers 18 and 20 must be designed to discriminate the signal which is to be processed from the others.

Figure 6:
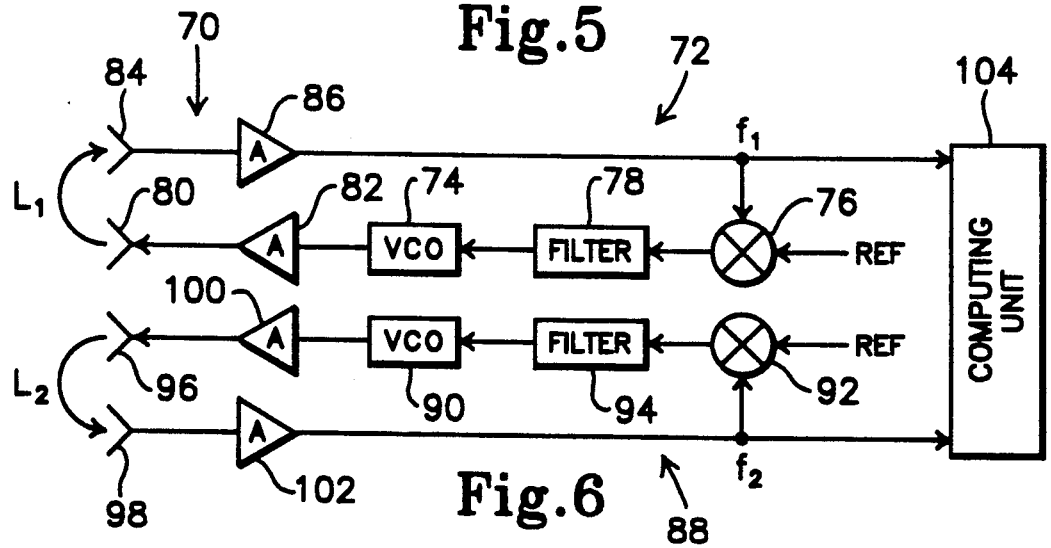
FIGS. 6 to 8 are simplified block diagrams illustrating alternative phase locked loop arrangements of the present sensor.

FIG. 6 illustrates an alternative arrangement for obtaining the phase difference signals $\phi$ and $\theta$ using two phase locked loops operating individually. A sensor 70 includes a first phase locked loop 72 having a VCO 74, phase detector or mixer 76, and loop filter 78. The output of the VCO 74 is connected to a downstream transmitter 80 through an amplifier 82. A downstream receiver 84 is connected through an amplifier 86 to an input of the mixer 76. The distance between the transmitter 80 and receiver is $L_1$. A similar phase locked loop 88 including a VCO 90, mixer 92, and loop filter 94 is connected to an upstream transmitter 96 and receiver 98. Amplifiers 100 and 102 are provided as shown, with the distance between the transmitter 96 and receiver 98 being $L_2$. The phase reference signal REF is applied to the mixers 76 and 92.

The amplifier 86 produces an downstream frequency $f_1$, whereas the amplifier 102 produces an upstream frequency $f_2$. A computing unit 104 computes the mass flow rate using the following relations $$f_1 = \frac{REF(c - v)}{2\pi L_1} \quad \text{Equ (27)}$$

and $$f_2 = \frac{REF(c + v)}{2\pi L_2} \quad \text{Equ (28)}$$

The sensor 70 simplifies the basic calculations required to compute the mass flow rate, but requires more hardware, specifically an additional transmitter.

Figure 7:
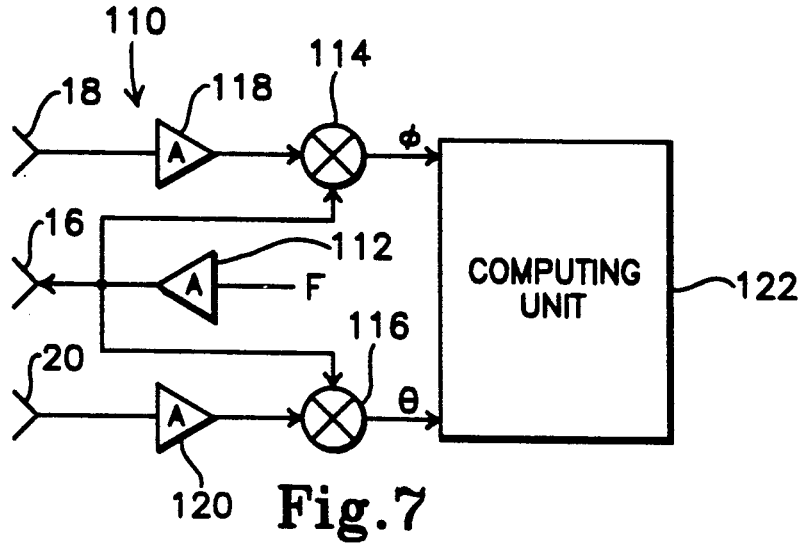

FIG. 7 illustrates another sensor 110 embodying the present invention including the transmitter 16 and receivers 18 and 20 as described above. In addition, the sensor 110 includes two phase locked loops connected to operate in an open loop configuration. A fixed frequency F is applied through an amplifier 112 to the transmitter 16, and also to inputs of mixers 114 and 116. The signals from the receivers 18 and 20 are applied through amplifiers 118 and 120 to other inputs of the mixers 114 and 116.

The mixer 114 produces the downstream phase difference signal $\phi$ and the mixer 116 produces the upstream phase difference signal $\theta$. A computing unit 122 computes the speed of sound c and material velocity $v$ as $$v = \omega \frac{[L_1\theta - L_2\phi]}{2\phi\theta} \quad \text{Equ (29)}$$

and $$c = \omega \frac{[L_1\theta + L_2\phi]}{2\phi\theta} \quad \text{Equ (30)}$$

where $\omega$ is the angular velocity of the acoustic signal and is equal to $2\pi f$. The mass flow rate may be computed from c and $v$ as described above.

Figure 8:
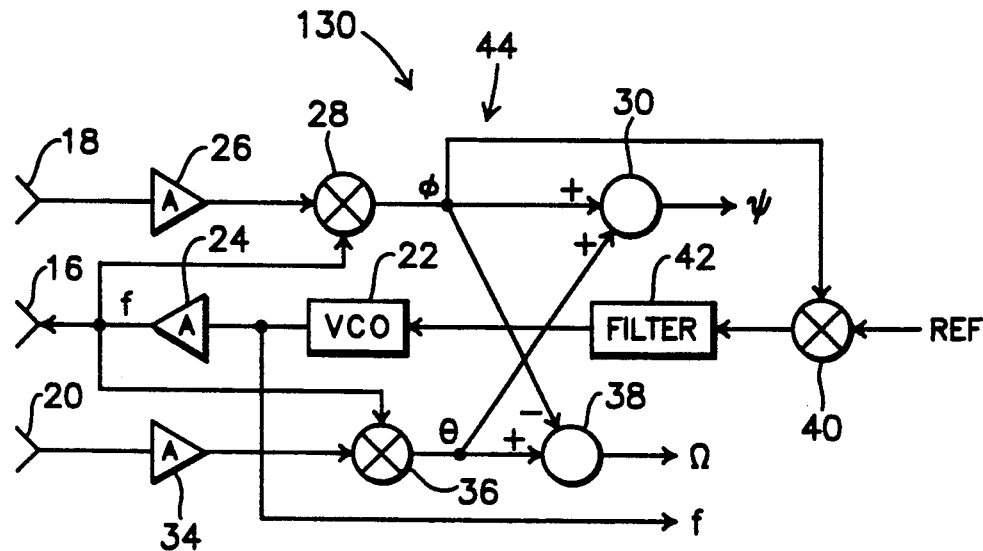

FIG. 8 illustrates a sensor 130 which is similar to the sensor 14 shown in FIG. 2, with like elements designated by the same reference numerals. The sensor 130 is different in that the input to the phase locked loop 44 is taken from the output of the mixer 28 rather than from the output of the adder 30. It is further possible to take the input to the phase locked loop 44 from the output of the mixer 36 or the subtractor 38, although not illustrated.

Figure 9:
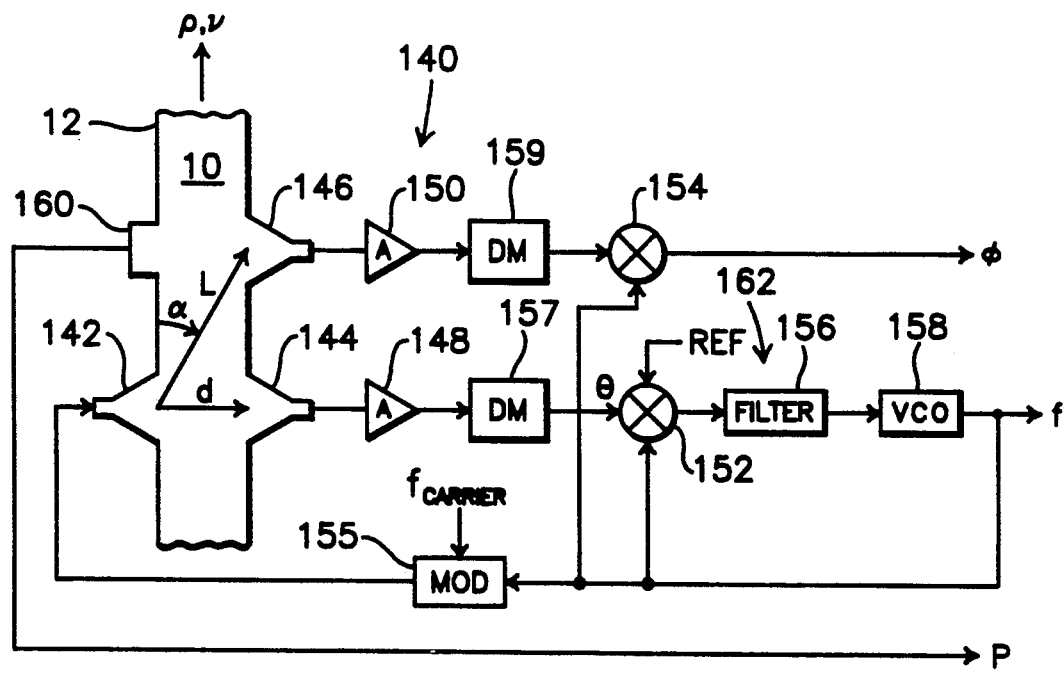
FIG. 9 is a schematic diagram of a first section of a simplified mass flow rate sensor embodying the present invention.

FIG. 9 illustrates a simplified embodiment of the invention which is advantageous in that the speed of sound c can be derived from the output of only one receiver. A sensor 140 includes a transmitter 142, and an upstream receiver 144 which is spaced by a distance d from the transmitter 142 on the opposite side of the conduit 12. A downstream receiver 146 is spaced from the receiver 146 by a distance L and an angle of $\alpha$. The direction of propagation of the signal from the transmitter 142 to the receiver 144 is perpendicular to the flow direction of the material 10, and therefore the velocity of movement $v$ does not affect this propagation. This enables direct measurement of the speed of sound c using only the transmitter 142 and receiver 144.

The outputs of the receivers 144 and 146 are connected through amplifiers 148 and 150 to inputs of mixers 152 and 154 respectively. The downstream phase difference signal $\phi$ appears at the output of the mixer 154. The mixer 152 has an input connected to receive the phase difference reference signal REF, and an output connected through a loop filter 156 to a VCO 158. The VCO 158 produces the acoustic signal f, which is applied to the transmitter 142 and mixers 152 and 154. A pressure sensor 160 produces the signal P. The VCO 158, filter 156, and mixer 152 constitute a phase locked loop 162 which receives the output of the receiver 144 as an input.

It is further within the scope of the invention to modulate the acoustic signal f onto a carrier signal having a frequency which is generally at least ten times the acoustic frequency in any of the embodiments described above. FIG. 9 illustrates a modulator 155 for modulating the acoustic signal f onto a carrier signal $f_{carrier}$. Demodulators 157 and 159 are provided for demodulating the output signals of the amplifiers 148 and 150 to recover the respective audio frequency received signals.

Figure 10:
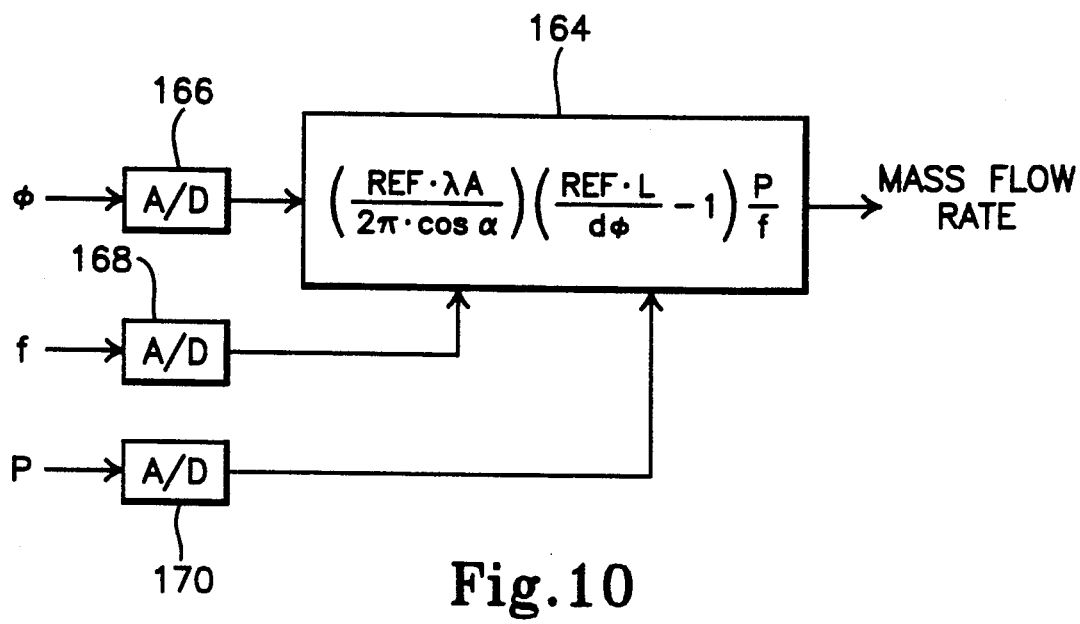
FIG. 10 is a block diagram of a second section of the simplified sensor.

FIG. 10 illustrates a computing means including a microcomputer unit 164 for computing the mass flow rate of the material 10 in accordance with a prestored software program. The analog signals $\phi$, f and P are applied to the unit 164 through analog-to-digital converters 166, 168 and 170 respectively. The unit 164 computes the mass flow rate dm/dt in accordance with the following function $$dm/dt = \left(\frac{REF \cdot vA}{2\pi d \cdot \cos\alpha}\right)\left(\frac{REF \cdot L}{d\phi} - 1\right)\frac{p}{f} \quad \text{Equ (31)}$$

As with the other embodiments illustrated above, it is within the scope of the invention to solve Equ(31) using individual hardware components rather than the microcomputer unit 164.

As discussed above, the velocity of propagation of the signal between the transmitter and receivers, phase difference between the transmitted and received signals, propagation time difference, and wavelength difference are analogous and are related to each other by proportionality constants. Therefore, any of the embodiments of the invention may be practiced by computing the velocity of signal propagation as a predetermined function of any of the associated parameters. For example, the time of flight or propagation time $t_d$ from a transmitter to a receiver is related to the phase difference between the transmitted and received signals in accordance with the following relation $$t_d = \frac{\phi}{2\pi f} \qquad \text{Equ (32)}$$

Figure 11:
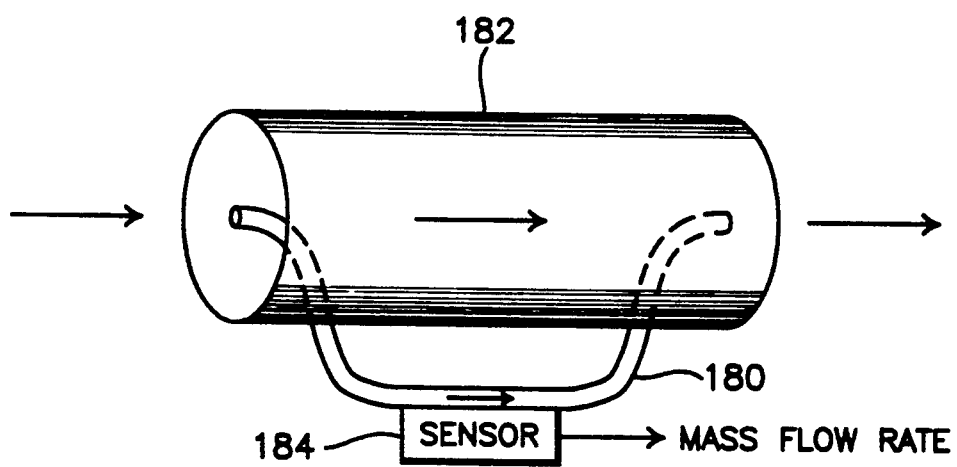
FIG. 11 is a diagram illustrating an alternative configuration of the present invention in which a sensor is provided to sense the material flow through a bypass passageway.

While the present sensor has been described and illustrated above as being constructed to operate directly on the material flowing through a passageway or conduit, it is within the scope of the invention as shown in FIG. 11 to provide a bypass passageway 180 which bypasses a portion of a main passageway 182 through which a primary portion of the material flows, and employ a sensor 184 embodying the invention to sense the mass flow rate, speed of sound, and/or temperature of a secondary portion of material which flows through the bypass passageway 180. The inlet and outlet of the bypass passageway 180 are preferably aligned with the central axis of the main passageway 182, but the invention is not so limited.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A sensor for sensing the mass flow rate of a material, comprising:
    transmitter means for transmitting a periodically varying signal into the material;
    first sensor means for sensing a first phase difference between said signal as transmitted by the transmitter means and after propagation through the material in a first direction by a first distance;
    second sensor means for sensing a second phase difference between said signal as transmitted by the transmitter means and after propagation through the material in a second direction by a second distance; and
    computing means for computing the mass flow rate of the material as a predetermined function of the first and second phase differences, including:
        first means for computing a sum of the first and second phase differences;
        second means for computing a difference between the first and second phase differences; and
        third means for computing a quotient of said sum and difference;
    said quotient being substantially proportional to the ratio of the velocity of movement of the material to the speed of propagation (Mach number) of said signal through the material exclusive of movement of the material.

2. A sensor as in claim 1, in which the first sensor means and computing means in combination comprise phase locked loop means connected to adjust the frequency of said signal transmitted by the transmitter means so as to maintain said sum at a predetermined value.

3. A sensor as in claim 2, in which the first direction is substantially parallel to the direction of flow of the material, and the second direction is substantially opposite to the direction of flow of the material.

4. A sensor as in claim 2, in which the computing means comprises:
    fourth means for computing said speed of propagation as a second predetermined function of said frequency and said quotient; and
    fifth means for computing the mass flow rate of the material as a third predetermined function of said speed of propagation and said quotient.

5. A mass flow rate sensor for sensing the mass flow rate of a material, comprising:
    variable frequency oscillator means for generating a periodically varying signal;
    transmitter means for transmitting said signal into the material;
    first sensor means for sensing said signal after propagation through the material in a first direction by a first distance;
    second sensor means for sensing said signal after propagation through the material in a second direction by a second distance;
    first phase comparator means for sensing a first phase difference between said signal as transmitted by the transmitter means and said signal as sensed by the first sensor means;
    second phase comparator means for sensing a second phase difference between said signal as transmitted by the transmitter means and said signal as sensed by the second sensor means;
    phase locked loop means for controlling the variable frequency oscillator means to adjust the frequency of said signal so as to maintain a first predetermined function of at least one of the first and second phase differences at a predetermined value; and
    computing means for computing the mass flow rate of the material as a second predetermined function of said frequency and at least one of said first and second phase differences;
    the first direction being substantially parallel to the direction of flow of the material, and the second direction being substantially opposite to the first direction.

6. A mass flow rate sensor as in claim 5, in which the phase locked loop means is constructed to control the variable frequency oscillator means to adjust the frequency of said signal so as to maintain the first predetermined function as including both the first and second phase differences at said predetermined value.

7. A mass flow rate sensor as in claim 5, in which the computing means comprises, for computing the mass flow rate of the material in accordance with the second predetermined function:

first means for computing the ratio of the velocity of movement of the material to the speed of propagation (Mach number) of said signal through the material exclusive of movement of the material as a third predetermined function of the first and second phase differences;

second means for computing said speed as a fourth predetermined function of said frequency and said ratio; and third means for computing the mass flow rate of the material as a fifth predetermined function of said speed and said ratio.

8. A mass flow rate sensor as in claim 5, in which:
the material is a gas;
the mass flow rate sensor further comprises pressure sensor means for sensing the pressure of the gas; and
the computing means is constructed to compute the mass flow rate of the material in accordance with the second predetermined function as further including the sensed pressure of the gas.

9. A mass flow rate sensor as in claim 5, in which:
the material is a gas;
the mass flow rate sensor further comprises temperature sensor means for sensing the temperature of the gas; and
the computing means is constructed to compute the mass flow rate of the material in accordance with the second predetermined function as further including the sensed temperature of the gas.

10. A mass flow rate sensor as in claim 5, in which the transmitter means is constructed to transmit the periodically varying signal into the material at an acoustic frequency.

11. A mass flow rate sensor as in claim 5, in which the transmitter means is constructed to transmit the periodically varying signal into the material as an acoustic signal modulated onto a carrier frequency.

12. A mass flow rate sensor as in claim 5, in which:
a primary portion of the material flows through a main passageway;
the mass flow rate sensor further comprises a bypass passageway which bypasses a portion of the main passageway;
a secondary portion of the material flows through the bypass passageway in parallel with said portion of the main passageway; and
the transmitter means, and the first and second sensor means are constructed to operate on the secondary portion of the material flowing through the bypass passageway.

13. A mass flow rate sensor as in claim 5, in which said predetermined value is selected to cause the phase locked loop means to operate about a stable operating point in a substantially linear manner.

14. A mass flow rate sensor as in claim 5, in which the computing means is further constructed to compute the velocity of movement of the material in accordance with a third predetermined function of said frequency and at least one of the first and second phase differences.

15. A mass flow rate sensor as in claim 5, in which the computing means is further constructed to compute the temperature of the material in accordance with a third predetermined function of said frequency and at least one of the first and second phase differences.

16. A mass flow rate sensor for sensing the mass flow rate of a material, comprising:

variable frequency oscillator means for generating a periodically varying signal;

transmitter means for transmitting said signal into the material;

first sensor means for sensing said signal after propagation through the material in a first direction by a first distance;

second sensor means for sensing said signal after propagation through the material in a second direction by a second distance;

first phase comparator means for sensing a first phase difference between said signal as transmitted by the transmitter means and said signal as sensed by the first sensor means;

second phase comparator means for sensing a second phase difference between said signal as transmitted by the transmitter means and said signal as sensed by the second sensor means;

phase locked loop means for controlling the variable frequency oscillator means to adjust the frequency of said signal so as to maintain a first predetermined function of at least one of the first and second phase differences at a predetermined value; and computing means for computing the mass flow rate of the material as a second predetermined function of said frequency and at least one of said first and second phase differences;

the first direction being substantially perpendicular to the direction of flow of the material, and the second direction extending at a predetermined angle to the direction of flow of the material; and the phase locked loop means being constructed to control the variable frequency oscillator means to adjust the frequency of said signal so as to maintain the first predetermined function as including only the first phase difference at said predetermined value.

17. A mass flow rate sensor as in claim 16, in which the computing means is constructed to compute the mass flow rate of the material in accordance with the second predetermined function as including said frequency and only the second phase difference.

18. A mass flow rate sensor as in claim 16, in which:
the material is a gas;
the mass flow rate sensor further comprises pressure sensor means for sensing the pressure of the gas; and
the computing means is constructed to compute the mass flow rate of the material in accordance with the second predetermined function as further including the sensed pressure of the gas.

19. A mass flow rate sensor as in claim 16, in which:
the material is a gas;
the mass flow rate sensor further comprises temperature sensor means for sensing the temperature of the gas; and
the computing means is constructed to compute the mass flow rate of the material in accordance with the second predetermined function as further including the sensed temperature of the gas.

20. A mass flow rate sensor as in claim 16, in which the transmitter means is constructed to transmit the periodically varying signal into the material at an acoustic frequency.

21. A mass flow rate sensor as in claim 16, in which the transmitter means is constructed to transmit the periodically varying signal into the material as an acoustic signal modulated onto a carrier frequency.

22. A mass flow rate sensor as in claim 16, in which:
a primary portion of the material flows through a main passageway;
the mass flow rate sensor further comprises a bypass passageway which bypasses a portion of the main passageway;
a secondary portion of the material flows through the bypass passageway in parallel with said portion of the main passageway; and
the transmitter means, and the first and second sensor means are constructed to operate on the secondary portion of the material flowing through the bypass passageway.

23. A mass flow rate sensor as in claim 16, in which said predetermined value is selected to cause the phase locked loop means to operate about a stable operating point in a substantially linear manner.

24. A mass flow rate sensor as in claim 16, in which the computing means is further constructed to compute the velocity of movement of the material in accordance with a third predetermined function of said frequency and at least one of the first and second phase differences.

25. A mass flow rate sensor as in claim 16, in which the computing means is further constructed to compute the temperature of the material in accordance with a third predetermined function of said frequency and at least one of the first and second phase differences.

* * * * *